United States Patent [19]
Foran et al.

[11] Patent Number: 6,072,500
[45] Date of Patent: *Jun. 6, 2000

[54] ANTIALIASED IMAGING WITH IMPROVED PIXEL SUPERSAMPLING

[75] Inventors: James L. Foran, Milpitas; Mark M. Leather, Saratoga, both of Calif.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/932,371

[22] Filed: Sep. 17, 1997

Related U.S. Application Data

[63] Continuation of application No. 08/693,536, Aug. 8, 1996, Pat. No. 5,684,939, which is a continuation of application No. 08/089,929, Jul. 9, 1993, abandoned.

[51] Int. Cl.[7] ..................................................... G06T 5/00
[52] U.S. Cl. ............................................ 345/431; 345/136
[58] Field of Search .................................... 345/422, 426, 345/431, 432, 136, 138

[56] References Cited

U.S. PATENT DOCUMENTS

| | | | |
|---|---|---|---|
| 4,570,233 | 2/1986 | Yan et al. | 345/426 |
| 4,918,625 | 4/1990 | Yan et al. | 345/431 |
| 5,027,292 | 6/1991 | Rossignac et al. | 395/122 |
| 5,123,085 | 6/1992 | Wells et al. | 345/422 |
| 5,265,214 | 11/1993 | Nitta | 395/122 |
| 5,363,475 | 11/1994 | Baker et al. | 395/122 |

OTHER PUBLICATIONS

Carpenter, "The A–Buffer, an Antialiased Hidden Surface Method", *Computer Graphics*, vol. 18, No. 3, Jul. 1984, pp. 103–108.

Haeberli, et al., "The Accumulation Buffer: Hardware Support for High–Quality Rendering", *Computer Graphics*, vol. 24, No. 4, pp. 309–313, Aug. 1990.

Schilling, "A New Simple and Efficient Antialiasing With Subpixel Masks", *Computer Graphics*, vol. 25, No.4, pp. 133–140, Jul. 1991.

*Primary Examiner*—Mark K. Zimmerman
*Attorney, Agent, or Firm*—Sterne, Kessler, Goldstein & Fox, PLLC

[57] ABSTRACT

An image processing system is described that receives polygonal image data at the direction of a processor and develops antialiased image data for display on a raster scanned display. In particular, the image system includes a scan convertor for converting the polygonal image data into pixel data, which includes pixel screen coordinates and at least one color value for each polygon covered pixel of the pixel data and a supersample coverage mask indicating an extent of polygon coverage within each polygon covered pixel. The image system also includes a raster system having at least one image processor for receiving the pixel data for each pixel, for developing a region mask based on the supersample coverage mask, and for storing the color value in association with the region mask as anitialiased display data in an image memory in communication with the image processor based on the pixel screen coordinates. The region mask indicates one or more, geographical regions of supersamples within each pixel covered by one or more polygons and indicates a color value stored in the image memory to be assigned to the supersamples in a region. This requires only a single color value for supersamples within a region of a covered pixel to be stored in the image memory. The image system can also be configured to develop and store Z-values, alpha values, stencil values, and texture values for each pixel for storage in the image memory in association with the region mask.

25 Claims, 10 Drawing Sheets

ANTIALIASED IMAGING WITH IMPROVED PIXEL SUPERSAMPLING

This application is a continuation of application no. 08/693,536, filed Aug. 8 1996, now U.S. Pat. No. 5,684,939, which is a continuation of 08/089,929, filed Jul. 9, 1993, (status: abandoned).

FIELD OF THE INVENTION

The present invention relates generally to antialiased imaging techniques, and more particularly to an antialiased imaging technique employing improved pixel supersampling.

BRIEF DESCRIPTION OF PRIOR ART

Images to be drawn on a raster-scan display, having a two dimensional array of pixel locations, must first be quantized to discrete memory locations, such as within a frame buffer, which correspond to the pixel locations of the array. This process limits the resolution of such displays to the physical characteristics of the array (i.e., 1024×1280 pixel locations) and often produces visual artifacts of the images when a human viewer's ability to resolve the displayed image exceeds the limited resolution of the display on which the image is drawn. This effect is referred to as "aliasing" because visual artifacts are created by differences in the spatial frequency characteristics of the display and the spatial frequency characteristics of the viewer's eyes. A familiar example of such an artifact is the jagged appearance of an image, such as a straight line or polygon edge, that results when the image is not aligned along a horizontal or vertical line of pixel locations. Techniques for removing or reducing artifacts by smoothing the appearance of the displayed image and/or increasing the spatial frequency characteristics of the display are known as "antialiasing" techniques.

Supersampling is an antialiasing technique that increases the spatial quantization of the display's array by increasing the number of data samples that are taken at or around each pixel location corresponding to a portion of the image to be displayed, and then combining the resulting values of these multiple data samples to obtain a final display value for each pixel location. In prior art systems, each supersample typicaly includes both a color-value (for either color or grey-scale systems) and a Z-value (a representation of the depth of a pixel which is used to perform hidden surface removal) relating to a reference point (one reference point per supersample) within the pixel. Some prior art Systems also include a supersample mask-value, which indicates whether the pixel is fully or part covered by a polygon.

In accordance with the operation of prior art supersampling techniques, the color value and Z-value for each reference point within a pixel are first sent to a processor which computes the color-value for each super-sample and compares the Z-value of each covered supersample against any previously stored value. The color value for each newly covered supersample is then updated accordingly. Supersampling using this prior art approach requires a substantial amount of processor performance, as well as storage space. The number of memory accesses required using this prior art technique is particularly notable, especially when it is considered that it is not only necessary to compute and store color values and Z-values for each of the supersamples (ie., N×1.3 million pixels of a 1024×1280 array, where N is the number of data samples taken per pixel), but that it is also necessary to update color-values and Z-values for each of the newly covered supersamples. Although the computation of color-values and Z-values for each supersample can be parallelized to speed up the process, at the cost of adding expensive processors, updating both of these values for every super-sample nevertheless becomes a significant performance limiting consideration.

BRIEF SUMMARY OF THE INVENTION

A preferred embodiment of the present invention comprises an image processing system that receives polygonal image data at the direction of a processor and develops antialiased image data for display on a raster scanned display. In particular, the image system includes a scan convertor for receiving screen coordinate based pixel data and for generating at least one color value and supersample coverage mask for each pit of the pixel data, where the coverage mask indicates a subset of supersamples within a pixl covered by a single polygon image. The image system also includes a raster system having at least one image processor for receiving the color value and the coverage mask, for developing a region mask for each pixel based on the coverage mask, and for storing the color value in association with the region mask in an image memory in communication with the image processor. The image processing system can also be configured to develop and store Z-values, alpha values, stencil values, and texture values for each pixel for storage in the image memory in association with the region mask.

BRIEF DESCRIPTION OF THE DRAWING

FIG. 2b is a representation of a coverage mask corresponding to the supersample grid of FIG. 2a;

FIG. 4b is a block diagram illustrating a texturing subsystem which may be utilized with the scan conversion subsystem and raster subsystem of FIG. 4a;

FIG. 5 is a block diagram further illustrating the image processor buffer, image processors, and display subsystem of FIG. 4a;

DETAILED DESCRIPTION OF PREFERRED EMBODIMENT

Figure 1:
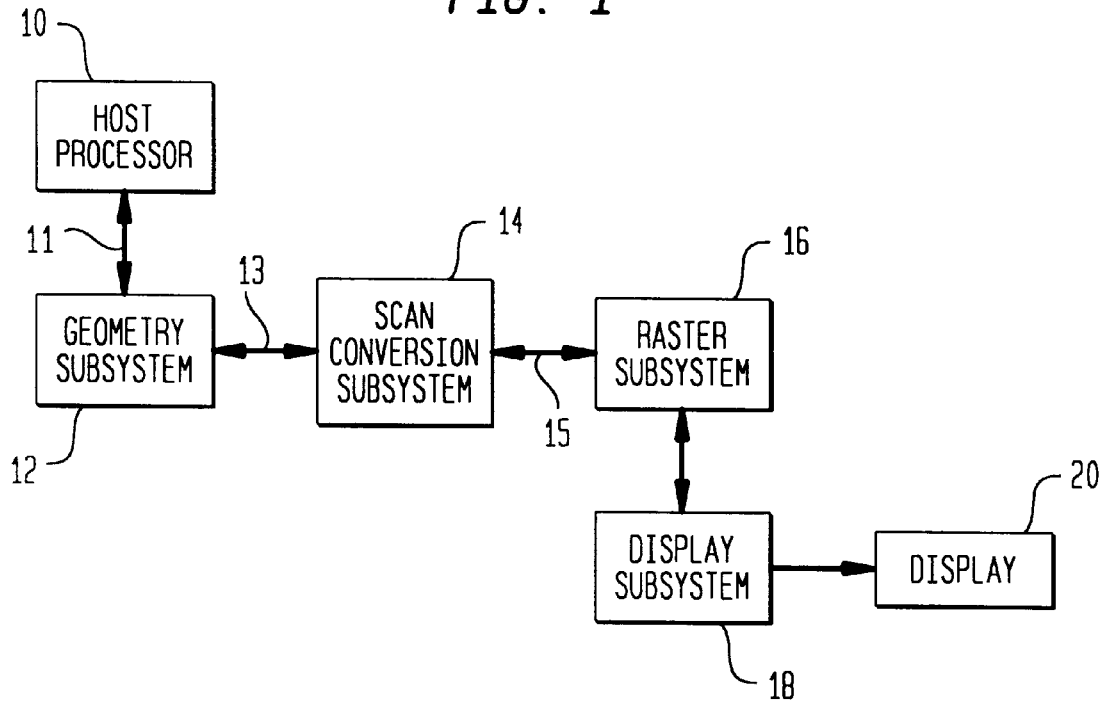
FIG. 1 is a block diagram of a host processor in communication with the graphics subsystem of a computer.

The present invention will be described herein with reference to numerous details set forth below and to the accompanying drawing figures which help to illustrate the invention. Numerous specific details are therefore described to provide a thorough understanding of the present invention, but certain well known or conventional details are not described in order to avoid obscuring the present invention with excessive unnecessary details. In addition, it should be noted that identical elements appearing in the various figures of the drawing are labeled with the same reference numeral or are unlabeled to avoid obscuring the drawing figures. Although the following description is intended to be illustrative of the presently preferred embodiment of the invention, it should not be construed as strictly limiting other possible applications of embodiments of the invention.

Computer systems, such as some of the workstation computers manufactured by Silicon Graphics, Inc., of Mountain View, Calif., that are utilized for the advanced generation and manipulation of 2-dimensional (2D) and 3-dimensional (3D) graphic images, typically include at least one graphics subsystem. A block diagram of such a graphics subsystem, interconnected between a host processor 10 of an appropriate computer system and a display 20. is shown in FIG. 1. The general architecture of this graphic subsystem is similar to the graphic subsystem architectures found in computer systems of the prior art, except for certain details of the raster subsystems, and except for other parts of the graphics subsystem, such as the scan conversion subsystem, which have been modified to operate in conjunction with the novel elements of the raster subsystem of the present invention. Thus, although it is possible to implement the present invention on a number of different computer systems, a preferred computer system is one which utilizes the various particularized features that are further described herein.

As illustrated in FIG. 1, host processor 10, one of possibly numerous general processing units of a computer system, is connected to the geometry system 12 of the graphics subsystem by a bus 11. The geometry sub-system 12 receives world coordinate based graphical data, typically polygon based images, from the host processor 10, typically in either 32-bit or 64-bit data packages, and converts that data to screen space coordinate data, based on the size of the display 20 to be utilized. The screen coordinate data is then transferred over the bus 13 for use by the scan conversion sub-system 14. This screen coordinate data specifies the vertices of the points, lines and polygons (data) that comprise the images that are eventually to be displayed, which are generally referred to as polygons, as is well understood in the art, throughout the remainder of this description.

The scan conversion subsystem 14 breaks the vertex data down into pixel data, such as pixel screen coordinates and parameter values for each of the individual pixels of the display 20. Each pixel is thereby assigned at least an X and Y screen coordinate, plus a number of parameters, such as red (R), green (G) and blue (B) color values, and alpha (A) values if alpha blending is supported. Alpha values are used to represent the opacity of a particular pixel. An additional pixel parameter is the supersample coverage mask, which is based on the size and geometry of a predefined supersample size, and which includes an indication of those supersamples which are covered or uncovered by the particular polygon to be drawn. Optionally pixel parameters also include Z-values (used to perform hidden surface removal), stencil values (used to selectively control the processing of a pixel), and texture values. Texture values (S and T) are used as part of a well known technique for mapping images onto the displayed surfaces of three-dimensional objects.

Figure 2A:
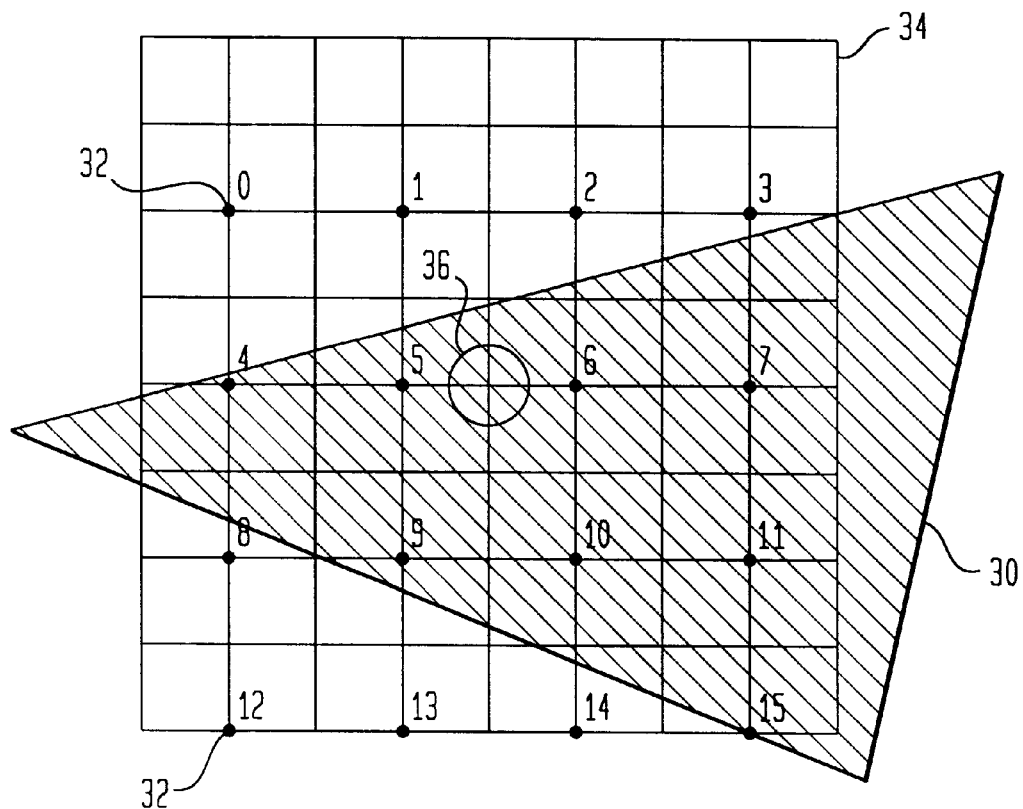
FIG. 2a is a representation of a polygon overlaying a supersample grid of a pixel.

FIG. 2a illustrates how a 16-bit supersample coverage mask is derived by the scan conversion subsystem 14 by sampling a polygon 30 of the vertex data at sixteen (0–15) discrete points 32. Each point 32 is aligned to a geometrically predefine 8-by 8 grid 34 over the current pixel, which has an origin 36. With respect to the supersample coverage mask of the preferred embodiment, the predetermined method for choosing such supersamples is that of point sampling. It should be noted, however, that the present invention is independent of the method by which samples are chosen and would work equally well with an area sampling technique.

Figure 2B:
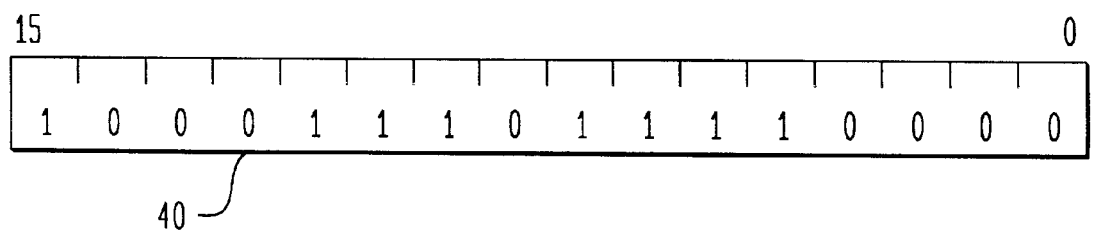

If a sample point 32 intersects the polygon, the corresponding bit in the supersample coverage mask 40 of FIG. 2b is set to "1." In the present example, bits four to seven, nine to eleven and fifteen are set to "1." If the sample point 32 lies outside the polygon 30, then the corresponding bits of the supersample coverage mask 40 are set to "0." Although hardware constraints of the scan conversion subsystem of the preferred embodiment of the present invention dictate that sample patterns must be constant from pixel to pixel and that each sample must fall on an 8-by-8 grid covering the pixel, a system excluding these constraints could be readily envisioned by a person of ordinary skill in the art in view of the present disclosure.

Figure 3:
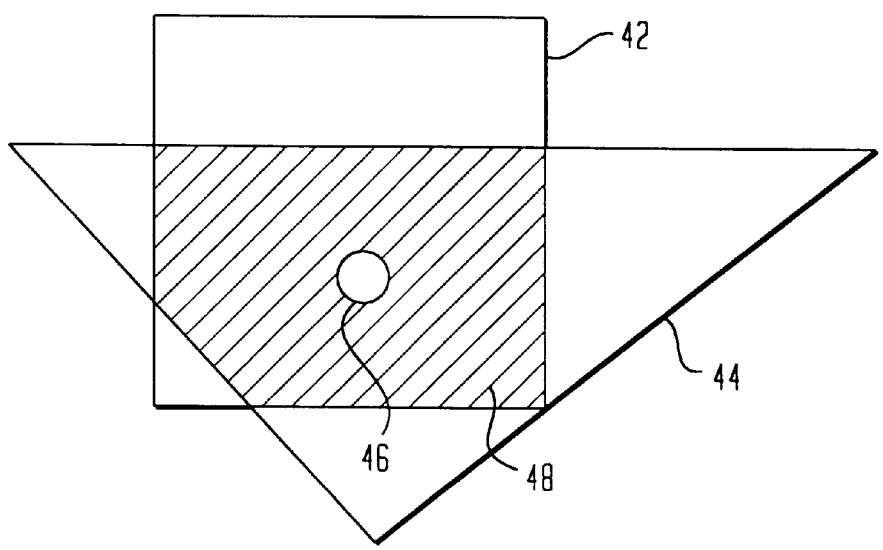
FIG. 3 is a representation of a polygon overlaying a pixel and illustrating a centroid of a pixel fragment.

FIG. 3 illustrates how color values for a pixel 42 are first determined by the scan conversion subsystem 14 computing R, G and B (and A, if alpha blending is enabled) equations for the polygon 44 at the centroid 46 of the pixel fragment 48. The pixel fragment 48 is formed by the intersection of the pixel 42 and the polygon 44. Since the centroid 46 is guaranteed to lie inside both the pixel 42 and the polygon 44, in contrast to the pixel's origin which can lie outside of the polygon 44, the centroid 46 is used to compute the color values, thereby preventing illegal color values from being generated for the different pixels.

Again with respect to the present invention, for each polygon, the geometry subsystem 12 computes Zr, the Z-value at the orion of the pixel that is the reference pixel of the polygon, and the two partial derivatives of Z in screen X and screen Y space, and outputs this information to scan conversion subsystem 14. The two partial derivatives are also transferred to the raster subsystem 16. The Z-value that is subsequently computed by the scan conversion subsystem, for a polygon at the origin of each pixel is the value of the Z-equation:

$$Z = Zr + \Delta x \cdot \frac{\partial Z}{\partial x} + \Delta y \cdot \frac{\partial Z}{\partial y}$$

where $\Delta x$ and $\Delta y$ are offsets from the reference pixel of the polygon. This computation is also used even when the origin of the pixel does not intersect the polygon, which means that the Z-value may potentially lie outside the range of the polygon, or even outside the range of the number system. During the multisample operation described below, however, this Z-value is normally taken, along with the Z-equation parameters dZ/dx and dZ/dy, to compute Z-values for all of the covered supersamples of the pixel. Thus, even though the original Z-value may have been out of range, modulo arithmetic theory dictates that the final Z-values for the covered supersample must be within range. In the event the graphics system of the present invention is used in non-multisampled mode, the pixel would be ignored if the origin was not covered by the polygon, thereby removing the possibility of illegal Z-values.

The nature of stencil values, the composition of a stencil buffer, and the operation of a stencil test, which are subsequently referenced herein, are described in great detail in U.S. patent application Ser. No. 07/657,086, filed Feb. 15, 1991, which is incorporated by reference herein.

With respect to the present invention and with reference now to the raster subsystem 16, it should be noted that on a generalized basis, this raster subsystem operates like most raster subsystems in that it receives pixel data output by the scan conversion subsystem 14 over the bus 15, compares new pixel data to old pixel data stored in a memory, updates old pixel data as necessary on a pixel-by-pixel basis with new pixel data, and writes the updated pixel data into the memory. The content of this memory is then read out to the display subsystem 18 and converted into display signals for output to the display 20. As a point of reference, the present invention is most particularly directed to a new apparatus and methods related to the comparing and updating steps of such a raster subsystem.

Also with respect to the preferred embodiment of the present invention, the scan conversion subsystem 14 and raster subsystem 16 illustrated in FIG. 1 represent only one of five identical scan conversion subsystem and raster subsystem modules. As many as five, ten or twenty such modules could be utilized in this graphics subsystem to meet various additional graphics needs. Although multiple modules are preferred, a graphics sub-system could be readily developed that utilized only a single scan conversion subsystem and raster subsystem.

Figure 4A:
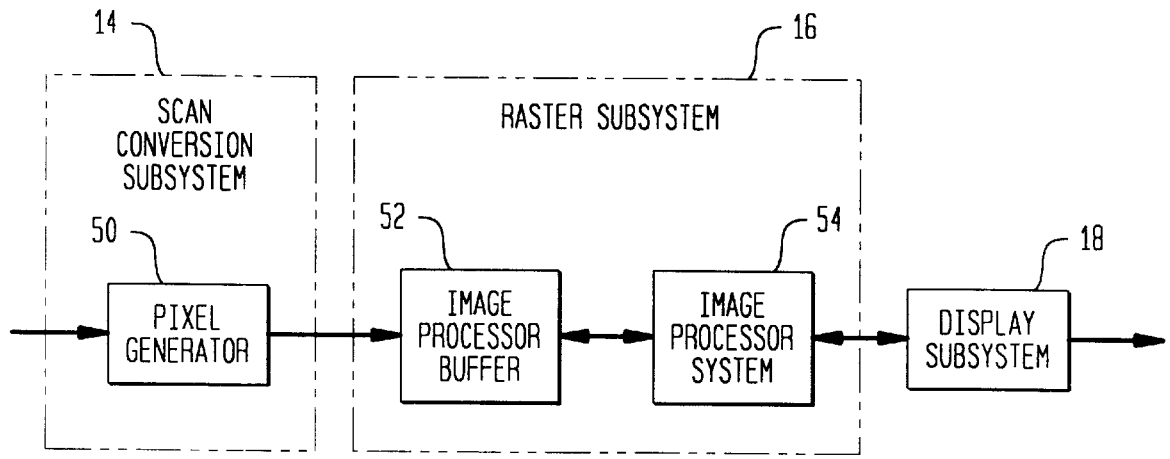
FIG. 4a is a block diagram further illustrating the scan conversion subsystem and raster subsystem of the graphics subsystem of FIG. 1.

FIG. 4a provides a general description of the scan conversion sub-system and raster subsystem of FIG. 1 to further assure that the overall operation of such subsystems is well understood. Scan conversion sub-system 14 includes a pixel generator 50, which generally includes one or more special processors for decomposing the vertex data into X, Y and Z screen coordinates and deriving the various pixel parameters described above for each pixel. Pixel generator 50 also specifies the supersample coverage mask described above to the raster subsystem 16, which includes image processor buffer 52 and image processor system 54. If texturing is supported, as further illustrated below with respect to FIG. 4b, pixel generator 50 also outputs texture coordinates and texture data.

Figure 4B:
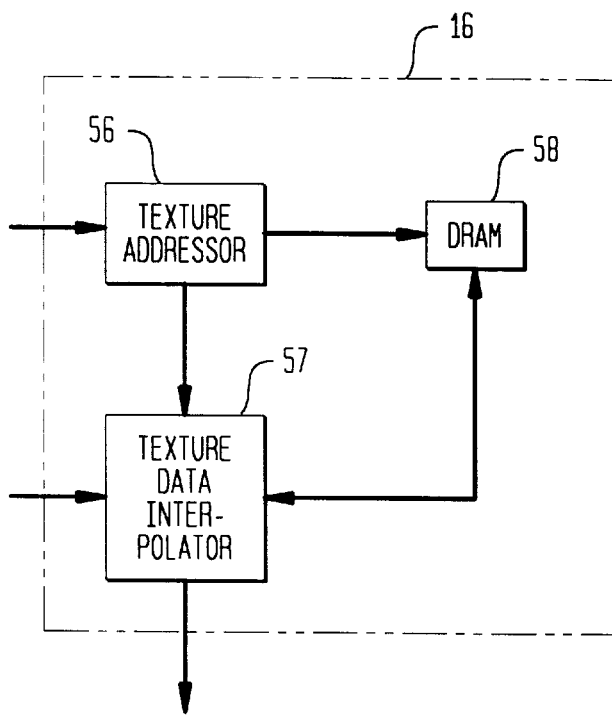

A preferred embodiment of the present invention would also include a texturing subsystem such as that illustrated in FIG. 4b, although the inclusion of such a texturing subsystem is not necessary to practice the present invention. In this texturing subsystem embodiment, raster sub-system 16 is configured to also include a texture addressor 56, a texture data interpolator 57 and a DRAM (Dynamic Random Access Memory) 58. In operation, texture coordinates and texture data (as appropriate) are output from pixel generator 50 and input to the texture addressor 56 and the texture data interpolator 58, respectively. Texture addressor 56 uses the texture coordinates to look up texture addresses for texture sample values S and T in the texture map stored in DRAM 58. Texture data interpolator 57 interpolates the texture sample values read from DRAM 58, utilizing the subtexel addresses from texture addressor 56, and/or texture data from pixel generator 50, to obtain textured pixel color values for output to image processor buffer 52.

Referring now back to FIG. 4a, image processor buffer 52 receives the color values (textured or not), the pixel coordinates (X, Y and Z), and the supersample coverage mask, and temporarily stores this information before allocating it between up to sixteen image processors 60 (such as IMP0–IMP15 of FIG. 5) of the image processor system 54. Although a smaller number of image processors 60 could be used for each raster subsystem, sixteen image processors are presently believed to provide sufficient pixel data processing power and speed to produce good imaging performance.

Figure 5:
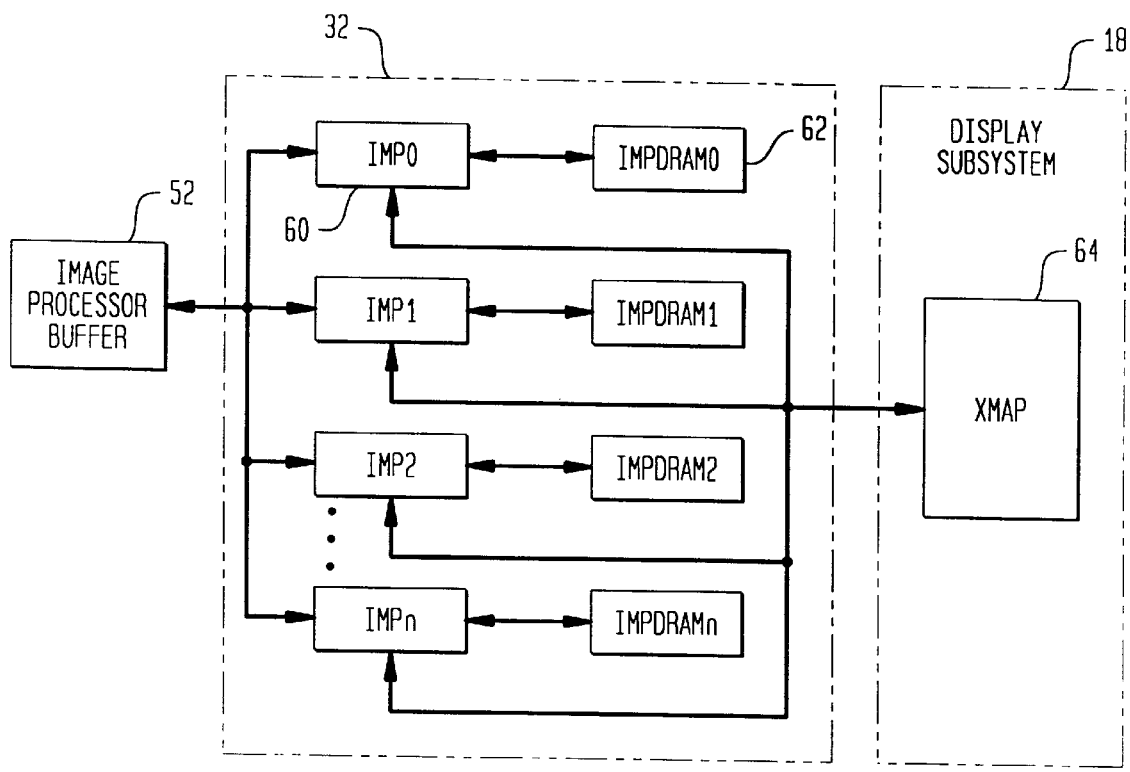

As illustrated in FIG. 5, each of the image processors 60 (such as $IMP_O$, $IMP_1$, $IMP_2$ and $IMP_n$) processes the pixel coordinates and pixel parameters so as to perform antialiasing, as well as Z-buffering and alpha blending, on a supersampled basis, and then store the resulting image data in a dedicated image memory 62, typically a 256K by 16-bit DRAM, referred to as an IMPDRAM, such as $IMPDRAM_O$, $IMPDRAM_1$, $IMPDRAM_2$ and $IMPDRAM_n$. Antialiasing is performed, in general by updating and maintaining the supersampled representations of each pixel, which are processed as though grouped into geographical regions, each region corresponding to those supersample representations having common polygon coverage within that pixel and determining whether to store new colors and/or Z-values for a region or for each supersample representation based on changes in the pixel's polygon coverage.

Once the IMPDRAMs 62 have been loaded, periodic interrupt requests generated by XMAP 64 to different image processors causes image data to be read from the IMPDRAMs 62 and sent to the display subsystem 18, such that each pixel can appear on the screen of the display 20. When responding to an interrupt request, a targeted image processor 60 stops its current operations while image data is output to the display subsystem.

Having now described the basic operation of a graphics subsystem capable of implementing the present invention, additional information about the specific hardware requirements of such a system, as well as its antialiasing operations, will now be described.

Data communicated from the image processor buffer 52 to the image processors 609 such as the pulps DRAM address, its color-value, supersample coverage mask, etc., always take the form of data packets. Three types of data packets are generally utilized—pixel packets, block packets and register packets. Block packets and register packets are special data packets which are utilized for controlling the operation of each image processor 60 and need not be further specified for an adequate understanding of the present invention.

Once a pixel packet has been received by an image processor 60, some of the old pixel data regarding the subject pixel (to the extent such data exists), which is stored in an appropriate RAM 62 as "pixel memory," is read from the IMPDRAM 62 and used during the processing of the pixel packet. After processing, any updated pixel data is then stored in the same IMPDRAM 62 in place of the appropriate old pixel data. "Pixel memory" refers to the configuration or association of certain information about a pixel in a designated portion of the memory of an IMPDRAM 62, typically based on a pixel's screen coordinates, and includes graphical information about the pixel, such as is illustrated by the two multisampled pixel memories shown in FIGS. 6a and 6b. The preferred embodiment of the present invention provides for pixel memories of 32 bytes (an "A" system), 64 bytes (a "B" system) or 128 bytes (a "C" system), depending on how the graphics system is configured. Configuration factors which affect the size and configuration of pixel memories include the number of frame buffers utilized, the frame buffer format, the existence of a Z-buffer or a stencil buffer (further explained below), the size of the supersample, etc.

Figure 6A:
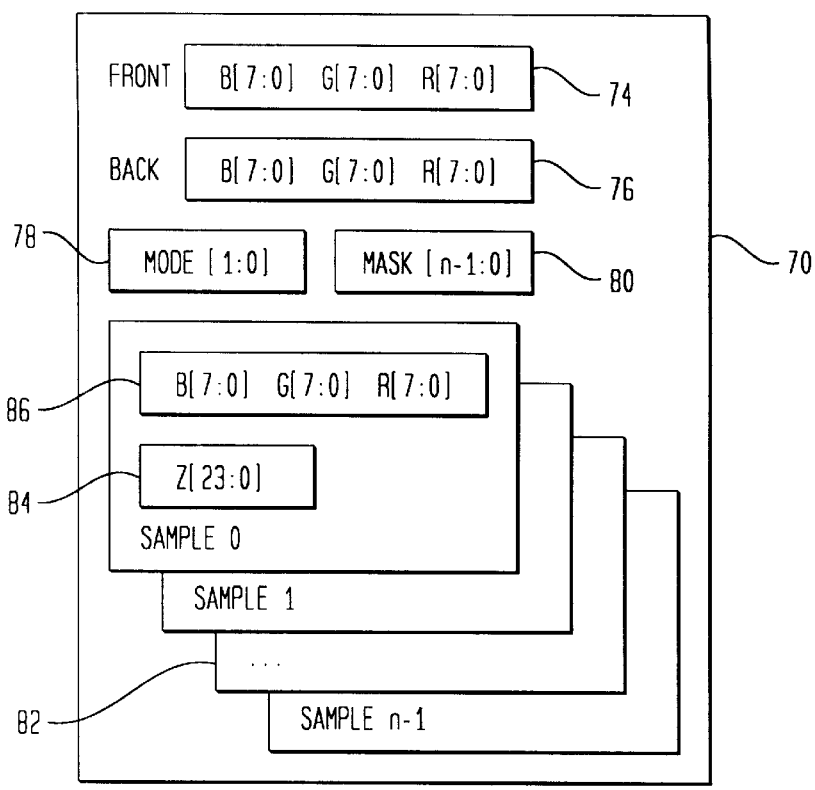
FIGS. 6a and 6b are representations of the formats of individual pixel memories.
Figure 6B:
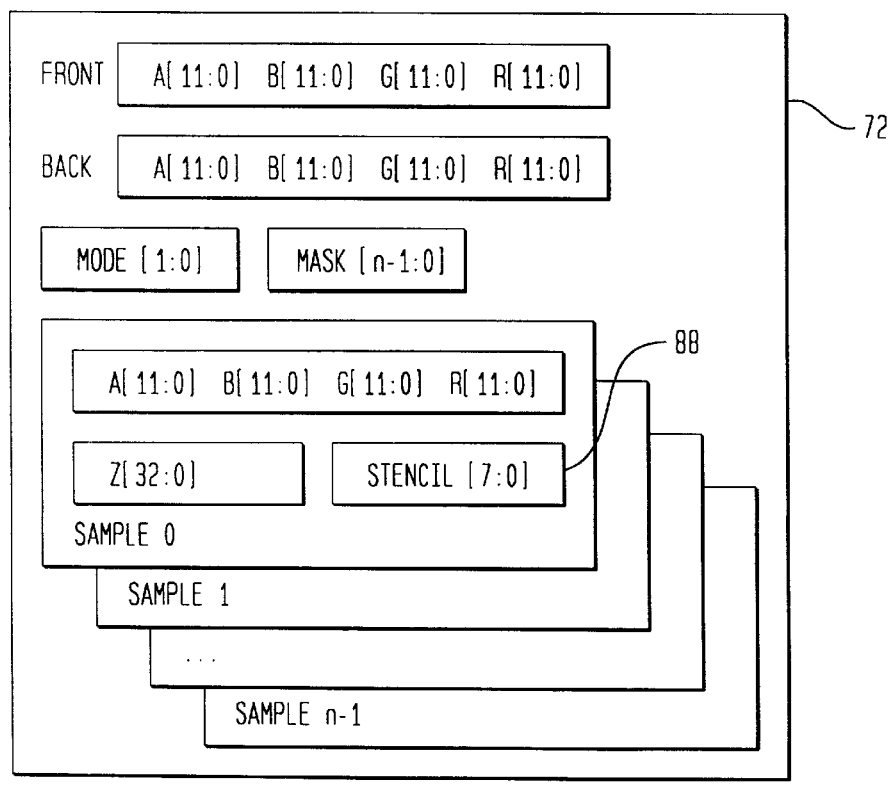

In FIG. 6a, a sample representation of a pixel memory 70 is shown for a graphics system that supports 8-bit color, front and back frame buffers (the functions of which are well known in the art), a 24-bit Z-buffer, and supersampling. FIG. 6b illustrates a sample representation of a pixel memory 72 for a graphics system that supports 12-bit color with alpha blending, front and back frame buffers, a 32-bit Z-buffer, an 8-bit stencil buffer, and supersampling. More specifically., with respect to FIG. 6a, pixel memory 70 includes color values for a front frame buffer 74 and a back frame buffer 76, a 2-bit mode indemnifiers 78 (as will be further explained below), a region mask 80 (also explained below), and either four, eight or sixteen supersamples 82. Each supersample 82 can have a Z-value 84 and a color value 86. Pixel memory 72 of FIG. 6b has the same basic format as pixel memory 70, except that it also includes 12-bit color values and alpha blending, a 32-bit Z-buffer value, and an 8-bit stencil buffer value 88.

The region mask 80 is a 4, 8 or 16-bit value, that is updated based on the supersample coverage mask and any prior region mask for a particular pixel in question. The region mask 80 is used to indicate supersample regions. The region mask provides an efficient means of identifying supersamples for which new color values and/or Z-values need to be generated, thereby avoiding the generation of such values on a supersample-by-supersample basis, and only generating such values for supersamples that need to be updated. Although both the region mask and coverage mask are referred to as masks in this description, any indicator of coverage or of a region could also be used.

It should be noted that although pixel memories 70 and 72 of FIGS. 6a and 6b illustrate the supersamples as though an individual color value and Z-buffer value (as well as a stencil value in the case of pixel memory 72) was assigned to each supersample, it is important to remember that: (1) the pixel memories 70 and 72 simply illustrate the type of pixel data stored in image memory 62 and not the actual content of image memory 62; and that (2) the image processors 60 only receive a single color value and Z-value per pixel, in order to conserve bandwidth and improve processor performance, and therefore have the sole responsibility for assigning appropriate color values and Z-values for each of the supersample of each pixel. It is also important to note that although the image processors 60 of the preferred embodiment of the present invention calculate Values for each supersample in order to properly antialiased intersecting polygons, a graphics system which utilized a common Z-value for each supersample could also be utilized without departing from the true spirit of the present invention.

Figure 7:
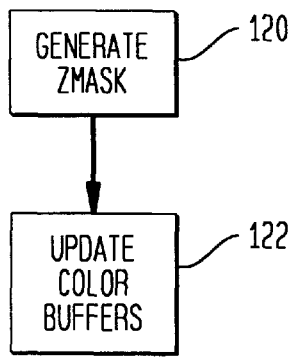
FIG. 7 is a simplified flow-chart representation of the multisample processing operation of the present invention.

FIG. 7 illustrates a preferred embodiment of the multisample, antialiasing process performed by each image processor 60 to generate Z-values and color values for each supersample. While the illustrated process is preferred because it is directed to a graphics system that incorporates a Z-buffer and a stencil buffer. Graphics systems which do not include such additional hardware could still benefit from the present invention. In particular, a graphics system which did not include Z or stencil buffer capabilities could effectively bypass step 120 by copying the supersample coverage to the Z-mask described below and incorporating only that portion of the process that is directed to generating color values.

To facilitate the present description, the above process is therefore described as being split into two primary steps, generating a Z-mask, step 120, which includes steps directed to comparing the supersample coverage mask of a pixel to an old region mask for the same pixel so as to perform stencil buffering and Z-buffering, and steps directed to generating color values so as to update the color buffers, step 122, which can be performed regardless of the results of the step 120. As previously mentioned, the region mask 80 is distinguished from the supersample coverage mask in that the coverage mask only identifies the coverage of a particular polygon with respect to a particular pixel whereas the region mask 80 is based on the preset coverage mask, and any relevant prior coverage mask, and identifies the supersamples within a particular pixel that are covered by each of up to two polygons. The Smask and Zmask are intermediate masks between the coverage mask and the region mask.

When reviewing the following description, it is important to remember that it is the duty of the image processor 60, when necessary, to generate Z-values and color values at each of the supersampled points within the pixel. It should also be noted that in the preferred embodiment of the present invention, no interpolation is done to derive color values for each supersample, although such interpolation could be performed. Hence, the same color value is used for all sample locations covered by a polygon responsible for generating the color value. This technique is accurate since gouraud shaded polygons, which generate smoothly varying color values, are utilized in the graphics system of the preferred embodiment. In the case of Z-values, however, each image processor 60 actually computes correct Z-values at each of the sample locations, since in the preferred embodiment, polygons may intersect within a pixel.

Figure 8A:
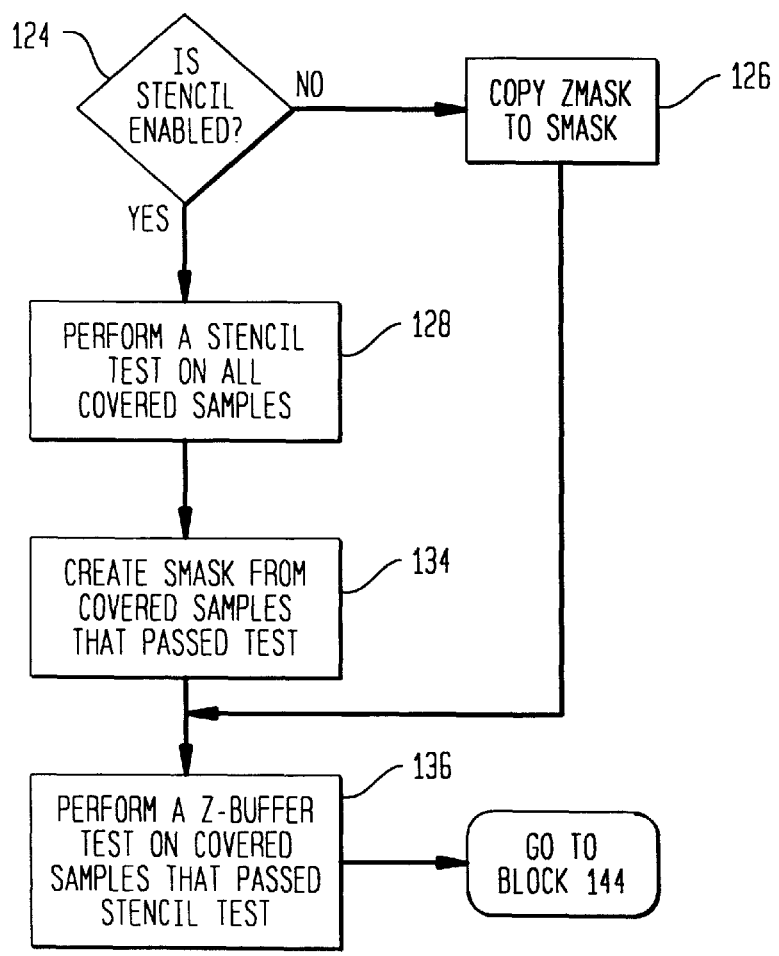
FIGS. 8a and 8b are flow-chart representations of the Z-pass mask generation step of FIG. 7.
Figure 8B:
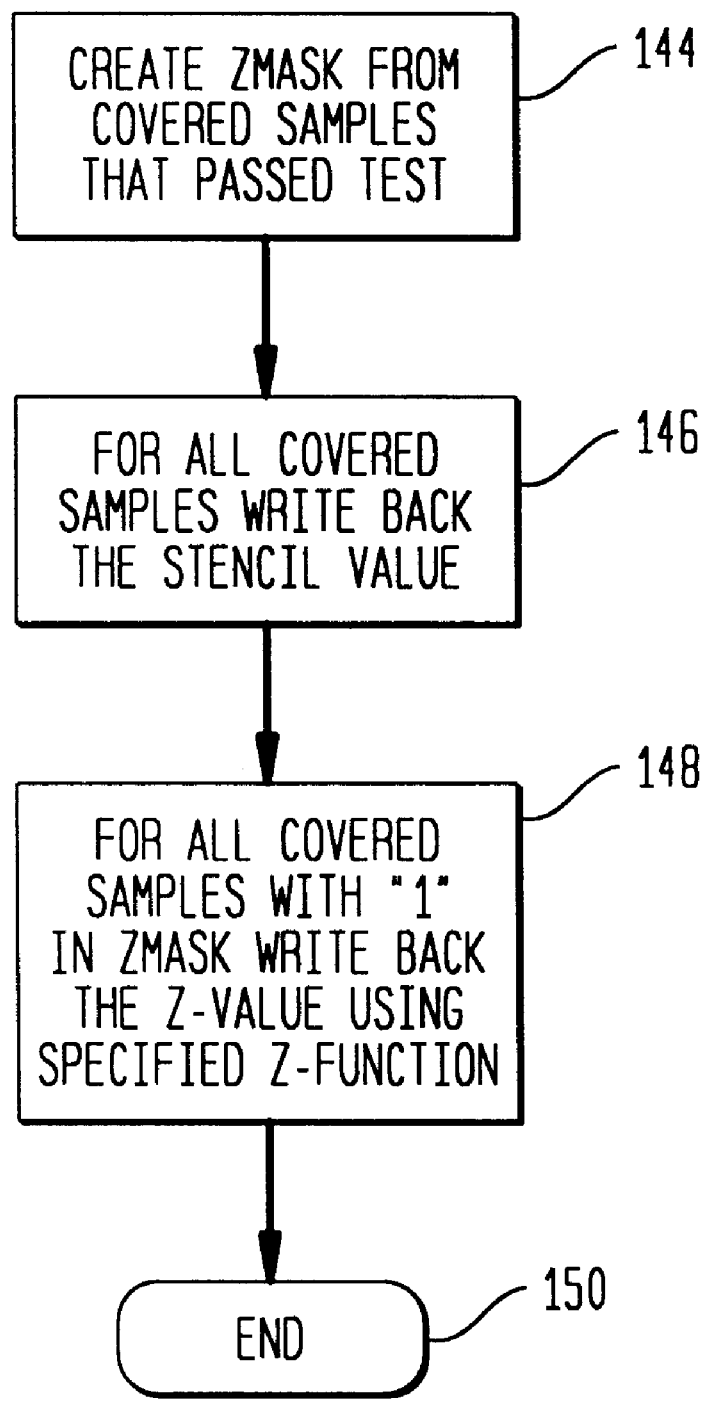

FIGS. 8a and 8b further illustrate step 120. In step 124, the image processor 60 looks to see if the stencil-buffer is enabled. If the stencil buffer is disabled, or not part of the configuration, the supersample coverage mask is simply copied to a stencil-pass mask (Smask), step 126, thereby bypassing the stencil operation. In this case, since the image processor 60 moves on directly to step 136, the Smask is configured to contain a "1" for each sample location which is indicated to be included in a region of the pixel covered by the new polygon.

If the stencil buffer is enabled, the stencil test, step 128, is performed for each of the sample locations indicated in the supersample coverage mask. The stencil test consists of a comparison of the current stencil value 70 with a specified reference value and is used to selectively control the processing of a pixel. The stencil test, step 128, returns a value of pass or fail depending on the selection of a stencil comparison function as listed in Table 1, where "ref" is the specified reference value and "stencil" is the current stencil value.

TABLE 1

Stencil Comparison Functions

| Function Name | Meaning |
| --- | --- |
| SF_NEVER | Neverpass. |
| SF_LESS | Pass if ref is less than stencil. |
| SF_LEQUAL | Pass if ref is less than or equal to stencil. |
| SF_EQUAL | Pass if ref is equal to stencil. |
| SF_GREATER | Pass if ref is greater than stencil. |
| SF_GEQUAL | Pass is ref is greater than or equal to stencil. |
| SF_NOTEQUAL | Pass if ref is not equal to stencil. |
| SF_ALWAYS | Always pass. |

This process results in the creation of the Smask, step 134, which now contains a "1" for each sample location indicated in the supersample coverage mask which successfully passed the stencil test.

Next, a Z-buffer test is performed for all sample locations indicated by the Smask, step 136. The Z-buffer test consists of a comparison at each sample location indicated by the Smask between the old Z-value pulled from the old region mask stored in image memory 62 and the new Z-value 84 calculated for that sample location. The test returns a value of pass or fail, depending on the selection of a comparison function as listed in Table 2. This process results in a modification of the Smask to create the Zmask, step 144 of FIG. 8*b*, such that sample locations are deleted if the comparison falls and remain if the comparison succeeds, i.e., hidden surface are removed.

TABLE 2

Z Comparison Functions

| Function Name | Meaning |
| --- | --- |
| ZF_NEVER | The Z-buffer function never passes. |
| ZF_LESS | The Z-buffer function passes if the incoming pixel Z-value is less than the Z-value stored in the Z-buffer bitplanes. |
| ZF_EQUAL | The Z-buffer function passes if the incoming pixel Z-value is equal to the Z-value stored in the Z-buffer bitplanes. |
| ZF_LEQUAL | The Z-buffer function passes if the incoming pixel Z-value is less than or equal to the Z-value stored in the Z-buffer bitplanes. (This is the default value). |
| ZF_GREATER | The Z-buffer function passes if the incoming pixel Z-value is greater than the Z-value stored in the Z-buffer bitplanes. |
| ZF_NOTEQUAL | The Z-buffer function passes if the incoming pixel Z-value is not equal to the Z-value stored in the Z-buffer bitplanes. |
| ZF_GEQUAL | The Z-buffer function passes if the incoming pixel Z-value is greater than or equal to the Z-value stored in the Z-buffer bitplanes. |
| ZF_ALWAYS | The Z-buffer function always passes |

If the stencil buffer exists and is enabled, it is updated at each covered sample location as a function of the stencil and Z-comparisons, as reflected in the Smask and the Zmark, respectively, step 146. The stencil buffer is updated (written back) according to one of the six below functions that are selected by software. A separate update function selection is made for each of the three cases: "fail", "pass", and "Zpass". The stencil buffer update options are listed in Table 3.

TABLE 3

Stencil Buffer Update Options

| Function Name | Meaning |
| --- | --- |
| ST_KEEP | Keep the current value (no change). |
| ST_ZERO | Replace with zero. |
| ST_REPLACE | Replace with the reference value. |
| ST_INCR | Increment by one (clamp to max). |
| ST_DECR | Decrement by one (clamp to zero) |
| ST_INVERT | Invert all bits. |

If the stencil comparison failed, the update method specified as "fail" is utilized. If the stencil comparison passed and the Z comparison failed, the update method "pass" is utilized. If the stencil comparison passed, and the Z comparison passed, the method "Zpass" is utilized. The Z-buffer is updated, step 148, at each sample location indicated by the Zmask.

Figure 10:
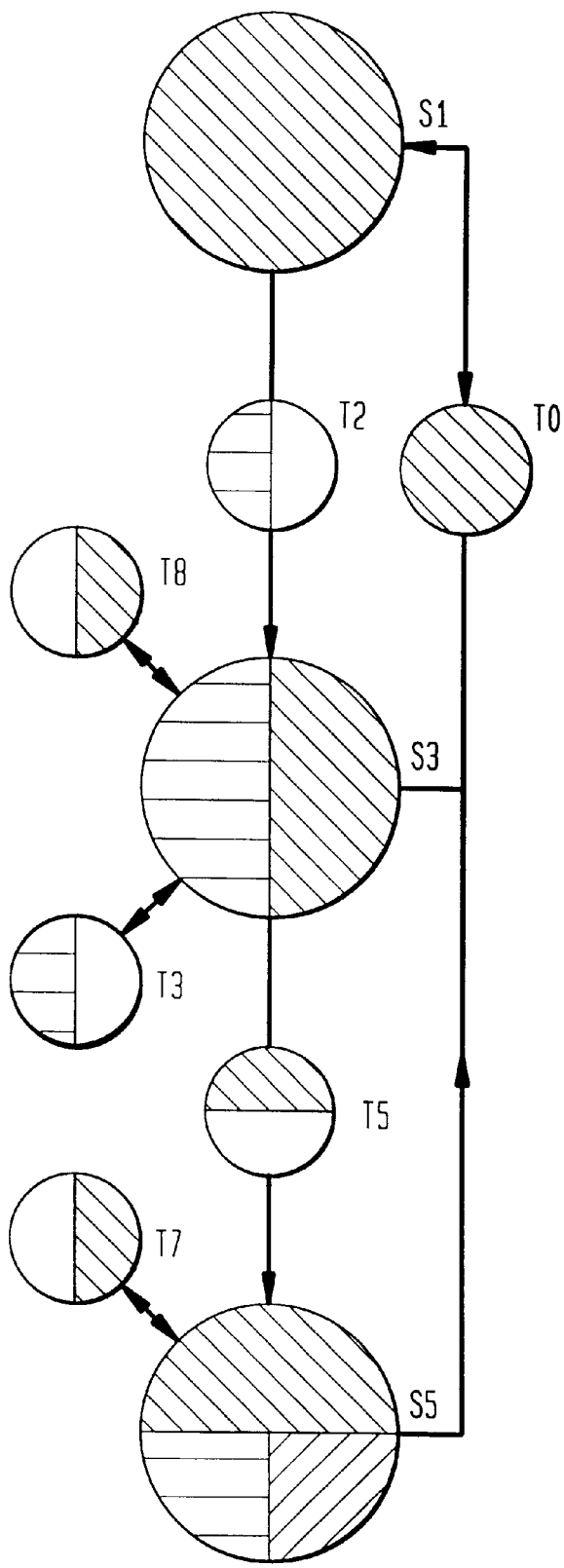
FIG. 10 is a state diagram illustrating the possible states and nonblended transition sequences of a pixel in accordance with the nonblended polygon rendering mode of operation of the present invention.
Figure 11:
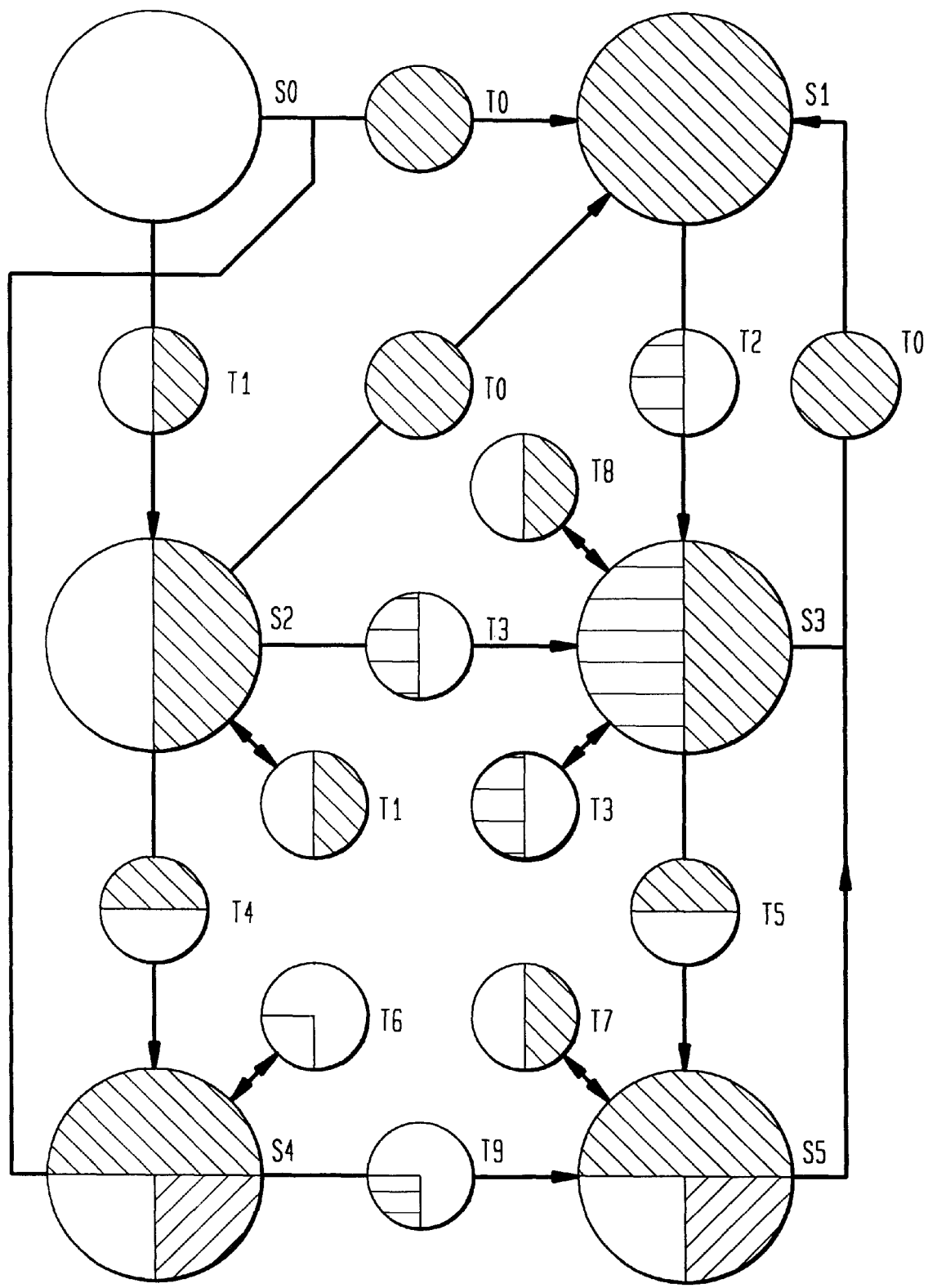
FIG. 11 is a state diagram illustrating the possible states and nonblended transition sequences available to a restricted class of applications in accordance with the nonblended polygon rendering mode of operation of the present invention.

The second portion of the multisample process of the present invention involves updating the color buffers, step 122 of FIG. 7. In accordance with the present invention, a pixel can exist in one of six possible states, designated as states S0 through S5 in FIGS. 10 through 12, and any pixel operation may cause a pixel to transition, such that it either changes states or remains in the same state, depending on the type of rendering mode that has been preselected. FIG. 10 illustrates the possible states and blended transition sequences which are possible when the blended polygon rendering mode is selected. FIG. 11 illustrates the possible states and restricted nonblended transition sequences which are normally utilized when the nonblended polygon rendering mode is selected. FIG. 12 illustrates the possible states and nonblended transition sequences which are available to a restricted class of display generating software applications when the nonblended polygon rendering mode is selected.

Each of the applications of the restricted class are allowed to utilize states in which some or all of a pixel's sample locations are uninitialized, which means the sample location is not covered by a polygon. Such applications, in order to achieve coherent rendering must guarantee that all sample locations within a pixel will be covered by some polygon prior to display or transitioning to blended polygon rendering mode. While applications may freely transition between blended and nonblended polygon rendering modes to achieve certain desired effects, the restricted class of applications may not transition between polygon rendering modes unless no pixels remain in the states in which uninitialized sample locations exist, such as states S0, S2 and S4.

The various pixel states S0–S5 are further explained below with reference to the FIGS. 10 through 12 and Table 4. As defined in Table 4, the state of a particular pixel is based on the region mask 80 and the mode identifier 78.

TABLE 4

Color Buffer Update Options

| State | Description | Mode | Mask |
| --- | --- | --- | --- |
| S0 | Pixel entirely uncovered | 00 | All "0"s |
| S1 | Pixel entirely covered by one polygon | 00 01 | All "1"s |
| S2 | Pixel partially covered by one polygon | 00 | "1" means covered "0" means uninitialized |
| S3 | Pixel entirely covered by two polygons | 10 | "0 " means 2nd polygon "1" means 1st polygon |
| S4 | Pixel partially covered by two or more polygons | 11 | "1" means covered "0" means uninitlalized |
| S5 | Pixel fully covered by three or more polygons | 11 | All "1"s |

The color buffer updating step involes an analysis of the present state of the pixel the new coverage mask (defined by the Smask), and the mode identifier so as to determine whether the pixel to be displayed is uncovered by a polygon, or entirely or partially covered by one or more polygons. This methodology allows a pixel's color information to be kept in an abbreviated form where a single color value is maintained for each region corresponding to the samples which are covered by a single polygon in nonblended mode or a common set of polygons in blended mode. This methodology introduces a substantial performance improvement over prior art techniques because: (1) it only requires color values to be processed for each region when the pixel is covered by one polygon (interior pixels) or two polygons (edge pixels); and (2) it takes advantage of the fact that pixels covered by only one or two polygons occur more frequently than pixels covered by more than two polygons, and that pixels covered by two or less polygons can be processed with fewer algorithmic operations and storage updates than pixels covered by two or more polygons.

Another important aspect of the present invention is that it is not overly dependent on the structure of the hardware specified in the preferred embodiment. For example, each pixel memory is merely an association of different portions of memory that have been assigned the same pixel screen coordinates, rather than just one particular physical location in memory, although the later would certainly be possible. In addition, there is no requirement that color values assigned to a pixel or a region be stored with a particular supersample in the pixel or the region, or any supersample, since the frame buffers can also be used to store color values.

The point at which this methodology "bails out" and stores a separate color value for each sample is immaterial to the present disclosure because any arbitrary level of complexity could have been chosen to be represented concisely. In accordance with the preferred embodiment of the present invention, however, the present invention bails out when a pixel contains three regions since such occurrences are relatively uncommon in the applications for which the preferred embodiment of the present invention is designed.

Figure 9:
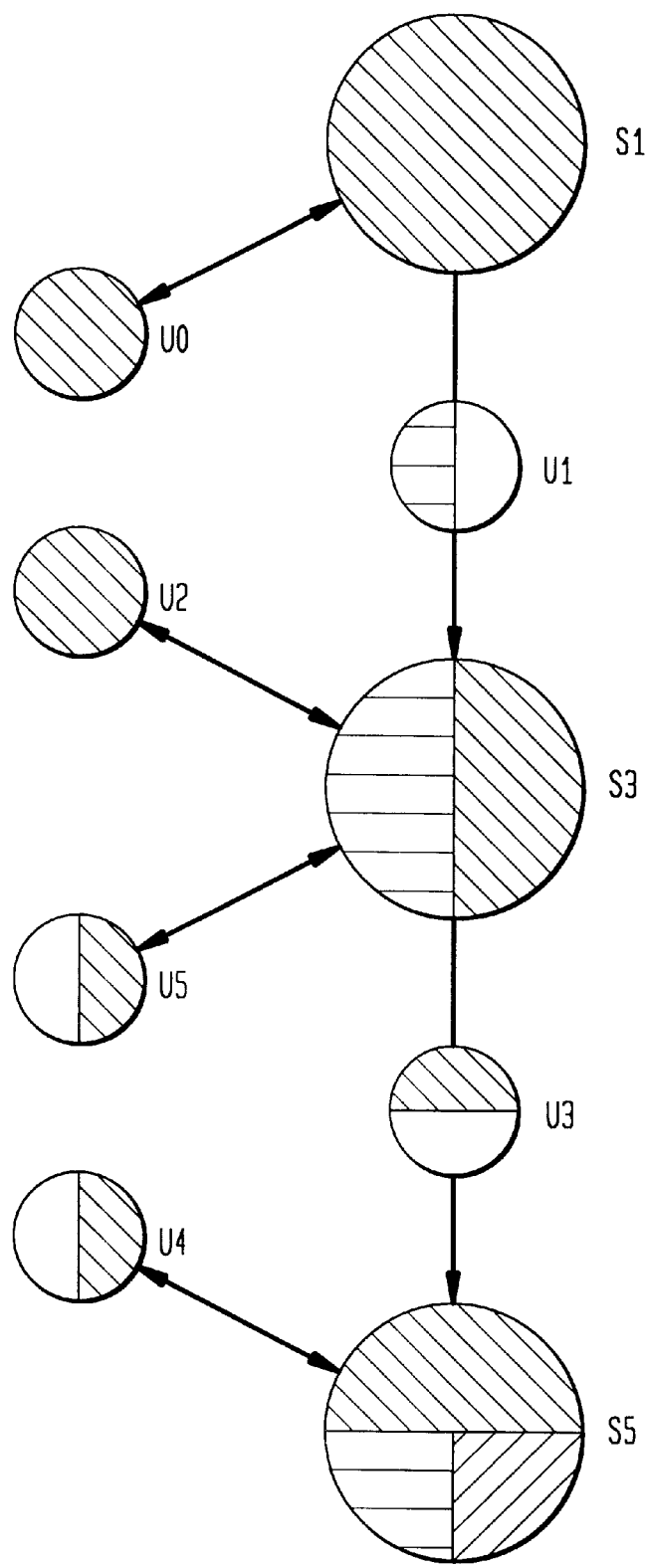
FIG. 9 is a state diagram illustrating the possible states and blended transition sequences of a pixel in accordance with the blended polygon rendering mode of operation of the preferred embodiment of the present invention.

With reference now to FIG. 9, the possible pixel states and pixel transition sequences which occur during blended polygon rendering mode operations will be described in further detail. Since all polygons are blended to implement features such as transparency, only certain states and transitions can be allowed. In such situations, all pixels are initialized to state S1, by a nonblended polygon rendering mode operation prior to the selection of the blended polygon rendering mode. As set out in Table 4, while in state S1, the two bit mode identifier 78 is set to "00" and the mask 80 is set to all "1's". Pixels in state S1 are covered by a single polygon (or a single set of polygons), which covers all sample locations. Therefore, the color value for all sample locations is the same.

If a new polygon is rendered which covers all the sample locations the transition U0 is executed and the pixel remains in state S1. During this transition, the color value is updated by blending the new polygon color with the previous color value. If the new polygon covers only a subset of the sample locations, then transition U1 is executed. The pixel then enters state S3 in which two regions exist. The region consisting of the samples not included in the subset covered by the new polygon receives the old color value and the region consisting of the samples included in the subset covered by the new polygon receives a new color value obtained by blending the old color value with the new polygon's color value. In state S3, the mode 78 is set to "10" and the mask 80 bits are set such that a "0" indicates that the corresponding sample is represented by the old color value while a "1" indicates that the sample is represented by the new color value.

Once a pixel is in state S3, if new polygons completely cover all of the sample locations, tradition U2 is executed and the pixel remains in state S3. This is because all sample locations are still representable by two color values. In this case, the color values for both regions are updated by blending the new color value with the old color value for the corresponding region. If a new polygon covers a subset of the sample locations, which is identical to the subset covered by either existing region, then transition U5 is executed and the pixel remains in state S3. In this case, only the color value for the region corresponding to the samples which are covered by both the new polygon and the matching region are updated by blending the new color value with the old color value of the matching region.

If a new polygon covers a subset of the sample locations which is not identical to the subset covered by either of the existing regions and does not cover all the sample locations, then transition U3 is executed and the pixel enters state S5. In state S5, the mode 78 is set to "11" and the mask 80 is set to all "1's". At this point the present implementation of the invention "bails out" and stores a separate color value for each sample. The color value is then set to the same value which represented the sample's color previously if the sample is not included in the subset of samples covered by the new polygon. If the sample is included in the subset of samples covered by the new polygon, then the value is derived by blending the new color value with the old color value for the region indicated by the old mask 80 value for that sample location.

Once a pixel is in state S5, all new polygons cause transitions U4 to be executed and the pixel remains in state S5. In transition U4, the color value of each sample which is included in the subset of samples covered by the new polygon is updated by blending the new color value with the old color value stored for that sample location. Once all polygons have been rendered, the pixels are all reset to state S1 prior to the start of the next rendering operation.

With reference now to FIG. 10, the possible pixel states and pixel transition sequences which occur during standard nonblended polygon rendering mode operations will be described in further detail. Nonblended operations are more common than blended operations with respect to a typical displayed scene. Nonblended operations occur when opaque polygons are rendered and hidden surfaces are removed by Z-buffering, which is performed with respect to each covered sample. For instance, an application could render opaque objects first in nonblended polygon rendering mode followed by the rendering of transparent surfaces using blended polygon rendering mode. Nonblended rendering operations use the same pixel states as in blended operations, but different transition processing occurs.

Initially, the frame buffer is cleared by rendering typically one large polygon. All pixels are thereby set to state S1. In state S1, the two bit mode identifier 78 is set to "00" and the mask 80 is set to all "1's." Pixels in state S1 are covered by a single polygon which covers all sample locations. Therefore, the color value for all sample locations is the same. If a new polygon is rendered which covers all of the sample locations, the transiton T0 is executed and the pixel remains in state S1. During this transition, the color value is updated to the new color value.

If the new polygon covers only a subset of the sample locations, then transition T2 is executed. The pixel then enters state S3, in which two regions exist. The region consisting of the samples not included in the subset covered by the new polygon receives the old color value and the region consisting of the samples included in the subset covered by the new polygon receives the new color value. In state S3, the mode 78 is set to "10" and the mask 80 bits are set such that a "0" indicates that the corresponding sample is represented by the old color value, while a "1" indicates that the sample is represented by the new color value.

Once a pixel is in state S3, if a new polygon completely covers all of the sample locations, transition T0 is executed and the pixel returns to state S1. This is because all of the sample locations are once again represented by a single color value. In this case, the color value is updated to the new color value. If a new polygon covers a subset of the sample locations, which includes all of the subsets covered by the existing region corresponding to the sample locations indicated by a "1" in the mask 80, then transition T3 is executed and the pixel remains in state S3. In this case, only the color value for the region corresponding to the sample locations indicated by a "1" in the mask 80 is updated to the new color value. If a new polygon covers a subset of the sample locations which includes all of the subset covered by the existing region corresponding to the sample locations indicated by a "0" in the mask 80, then transition T8 is executed and the pixel remains in state S3. In this case, only the color value for the region corresponding to the sample locations indicated by a "0" in the mask 80 is updated to the new color value.

If a new polygon covers a subset of the sample locations, which does not completely include the subset covered by either of the existing regions and does not cover all of the sample locations, then transition T5 is executed and the pixel enters state S5. In state S5, the mode 78 is set to "11" and the mask 80 is set to all "1's." At this point, the present implementation of the invention "bails out," as previously described, and stores a separate color value for each sample. The color value is then set to the same value which previously represented the sample's color, if the sample is not included in the subset of samples covered by the new polygon. If the sample is included in the subset of samples covered by the new polygon, then the color value is set to the new color value.

Once a pixel is in state S5, if a new polygon completely covers all of the sample locations, transition T0 is executed and the pixel return to state S1. This is because all sample locations are once again representable by a single color value. In this case, the color value is updated to the new color 4, value. If the new polygon covers only a subset of the sample locations, then transition T7 is executed. In transition, 17, the color value of each sample which is included in the subset of samples covered by the new polygon is updated to the new color value.

Once all polygons have been rendered, the pixels are all reset to state S1 prior to the start of the next rendering operations. Although the preferred embodiment of the present inventions does not provide a transition from state S5 to state S3, this or any similar augmentations of the basic methodology could be readily anticipated from the present disclosure.

With respect to the above described transitions, another feature of the preferred embodiment of the present invention is that it utilizes what is known as a "resolve on the fly" methodology which means multiple sample colors are resolved into a color value for the overall pixel inmediately following sample color resolution. This methodology is user friendly in that a valid rendering is always available for display in the frame buffer, such as back frame buffer 76, without the application specifying that rendering is complete. In state S1 of the previously described rendering mode operations, it is possible to take advantage of this resolve on the fly methodology to dispense with the storing of a separate memory location for the color of the single covered region. Instead, the color value stored in the background color buffer 76 is used if further processing requires splitting the pixel into multiple regions. An alternative embodiment of this methodology would be to postpone overall pixel color resolution until rendering completion is signaled by the application.

The transition sequences and states so far described are generally available to all display generating software application programs. Further performance enhancing features of the present invention are available, however, for a restricted set of display generating software applications which are capable of guaranteeing that all sample locations within the application's window in the frame buffer will be rendered prior to being displayed.

As was previously stated, each sample location has an associated Z-buffer value which is used to perform hidden surface removal. In all states previously described, the Z-values are all valid. For restricted nonblended applications, however, three additional states are provided which allow samples to exist in an uninitialized state. Such unrestricted applications require an initializing step where a background is rendered to initialize the frame buffer contents prior to the rendering of the foreground objects.

With reference now to FIG. 11 the possible pixel states and pixel transition sequences which occur during restricted, nonblended polygon rendering mode operations will be described in further detail. In the case of restricted applications, which are allowed to utilize states in which some samples are undefined, overall pixel color resolution is postponed until a state is entered in which all samples are defined. These states in which all samples are defined are the states S1, S3 and S5, which are utilized by the standard nonblended sequence previously described.

The restricted application begins by utilizing a specialized clearing function, as called for above, to set all pixels in its window to state S0. In state S0, the mode 78 is set to "00" and the mask 80 is set to all "0's." In addition, all sample data and resolved overall pixel colors are considered to be invalid, and all depth comparisons against uninitialized sample locations are considered to succeed. Restricted sequences are not allowed if Z-buffering is disabled or if Z-write is disabled. The specialized clearing function can be especially fast since only the mode 78 and mask 80 fields need to be written.

If a new polygon is rendered which covers all of the sample locations, the transition T0 is executed and the pixel enters state S1. During this transition, the color value is updated to the new color value.

If the new polygon covers only a subset of the sample locations, then transition T1 is executed. The pixel then enters state S2, in which two regions exist. The region consisting of the samples not included in the subset covered by the new polygon remain in an uninitialized state and the region consisting of the samples included in the subset covered by the new polygon receives the new color value. In state S2, the mode 78 is set to "00" and the mask 80 bits are set such that a "1" indicates that the corresponding sample is represented by the new color value, while a "0" indicates that the sample is uninitialized.

Once a pixel is in state S2, if a new polygon completely covers all of the sample locations, transition T0 is executed and the pixel enters state S1. This is because all sample locations are then representable by a single color value. In this case, the color value is updated to the new color value. If a new polygon covers a subset of the sample locations, which includes all of the subset covered by the, uninitialized region, then transition T3 is executed and the pixel enters state S3. In this state, the mode 78 is set to "10" and the locations covered by the new polygon are indicated by a "0" in mask 80. The color value for the region corresponding to the sample locations indicated by a "0" in the mask 80 are updated to the new color value.

If a new polygon covers a subset of the sample locations, which includes all of the subset covered by the existing region corresponding to the sample locations indicated by a "1" in the mask 80, then transition T1 is executed and the pixel remains in state S2. In this case, the color value for the region corresponding to the sample locations indicated by a "1" in the mask 80 are updated to the new color value.

If a new polygon covers a subset of the sample locations, which does not completely include the subset covered by either the existing region corresponding to those sample locations indicted by a "1" in the mask 80 or the uninitialized region corresponding to the sample locations indicated by a "0" in the mask 80, then transition T4 is executed and the pixel enters state S4. At this point, the present implementation of the invention "bails out" and stores a separate color value for each sample which is covered by any polygon. The color value is then set to the same value which represented the sample's color previously if the sample is covered, but is not included in the subset of samples covered by the new polygon. If the sample is included in the subset of samples covered by the new polygon, then the color value is set to the new color value. Sample locations which are contained in the uninitialized region have no defined value.

Once a pixel is in state S4, if a new polygon completely covers all of the sample locations, transition T0 is executed and the pixel enters state S1. This is because all sample locations are then representable by a single color value. In this case the color value is updated to the new color value. If a new polygon covers a subset of sample locations, which does not completely include the region corresponding to the uninitialized sample locations, then transition T6 is executed and the pixel remains in state S4. If a sample is included in the subset of sample locations which are covered by the new polygon, then the color value is set to the new color value.

If a new polygon covers a subset of sample locations which completely includes the region corresponding to the uninitialized sample locations, then transition T9 is executed and the pixel enters state S5. In state S5, the mode 78 is set to "11" and the mask 80 is set to all "1's." If a sample is included in the subset of sample locations which are covered by the new polygon, then the color value is set to the new color value.

Once all polygons have been rendered, the pixels are all reset to state S0 prior to the start of the next rendering operation.

In this disclosure, there is shown and described only the preferred embodiment of the present invention, but it is to be understood that the invention is capable of use in various other combinations and environments and is capable of changes and modifications within the scope of the inventive concept as expressed herein. In particular, while the preferred embodiment of the present invention is primarily described as a hardware embodiment, this does not preclude the inventions implementation in software or some other combination of hardware and software.

We claim:

1. A raster system for generating antialiased display data within an image processing system, wherein said image processing system includes a scan conversion subsystem for generating pixel packets which indicate polygon coverage within a pixel, wherein the pixel comprises a plurality of supersamples, comprising:

a first image memory for storing a first color value;

a second image memory for storing a second color value;

means for storing pixel memory that indicates a current state of the pixel, wherein said pixel memory comprises a region mask having a plurality of fields, each field being associated with a unique one of said plurality of supersamples, wherein when the color value of each supersample is either said first color value or said second color value, then each field associated with a supersample having said first color value stores an identifier that identifies said first image memory, and each field associated with a supersample having said second color value stores an identifier that identifies said second image memory; and an image processor, coupled to receive a pixel packet from the scan conversion subsystem, and further coupled to update said pixel memory, wherein said image processor generates antialiased display data based on said pixel memory, and wherein said image processor includes, means for determining a new pixel state based on said current state of the pixel and said pixel packet, and means for updating said pixel memory based on said new pixel state.

2. The raster system of claim 1, wherein said pixel memory further comprises a mode identifier, wherein said region mask and said mode identifier together indicate said current state of the pixel.

3. The raster system of claim 2, wherein said pixel packet comprises a supersample coverage mask.

4. The raster system of claim 3, wherein said pixel memory further comprises a plurality of supersample memories, each of said supersample memories including a color value field that stores a color value.

5. The raster system of claim 4, wherein said means for updating updates said color value field of each supersample memory only when the pixel is associated with more than two colors.

6. The raster system of claim 5, wherein each of said plurality of supersample memories further includes a Z-value field that stores a Z-value, and said pixel packet further comprises at least one Z-value.

7. The raster system of claim 6, wherein said means for updating performs Z-buffering on a supersample-by-supersample basis.

8. The raster system of claim 1, wherein said pixel memory indicates a current pixel state according to a rendering mode.

9. The raster system of claim 8, wherein said rendering mode comprises a blended polygon rendering mode and a non-blended polygon rendering mode.

10. The raster system of claim 1, wherein each of said fields of said region mask consists of a single binary digit that can hold one of two values: 0 or 1.

11. A method for generating antialiased display data comprising:

(1) storing a pixel memory that indicates a current state of a pixel that comprises a plurality of supersamples, wherein said pixel memory comprises a region mask having a plurality of fields, each field being associated with a unique one of said supersamples;

(2) receiving a pixel packet, wherein said pixel packet indicates polygon coverage within said pixel, and a first color value;

(3) storing a second color value in an image memory, wherein said second color value is a function of said first color value;

(4) determining a new pixel state based on said current pixel state and said pixel packet;

(5) updating said pixel memory based on said new pixel state, wherein if said new pixel state is a state in which the color value of each supersample is either said second color value or a third color value, each of the fields associated with a supersample having said second color value stores an identifier that identifies said image memory; and (6) generating antialiased display data based on said pixel memory.

12. The method of claim 11, wherein said pixel memory further comprises a mode identifier, wherein said region mask and said mode identifier together indicate said current state of said pixel.

13. The method of claim 12, wherein said pixel packet comprises a supersample coverage mask.

14. The method of claim 13, wherein said pixel memory further comprises a plurality of supersample memories, each of said supersample memories including a color value field that stores a color value.

15. The method of claim 14, wherein said color value field of each of said supersample memories is updated in step (5) only when said pixel is associated with more than two colors.

16. The method of claim 15, wherein each of said plurality of supersample memories further includes a Z-value field that stores a Z-value, and said pixel packet further comprises at least one Z-value.

17. The method of claim 16, wherein said step of updating comprises Z-buffering on a supersample-by-supersample basis.

18. The method of claim 11, wherein said second color value equals said first color value.

19. The method of claim 11, wherein said second color value is a function of not only said first color value, but also the color value stored in said image memory prior to said second color value being stored in said image memory.

20. A computer graphics system comprising:
a host processor, wherein said host processor generates world coordinate based graphical data;
a geometry subsystem, coupled to receive said world coordinate based graphical data, wherein said geometry subsystem converts said world coordinate based graphical data to screen space coordinate data;
a scan conversion subsystem, coupled to receive said screen space coordinate data, wherein said scan conversion subsystem generates pixel packets based on said screen space coordinate data;
a raster system including,
a first image memory for storing a first color value;
a second image memory for storing a second color value;
means for storing a pixel memory corresponding to a pixel comprising a plurality of supersamples, said pixel memory indicating a current state of said pixel and comprising a region mask having a plurality of fields, each field being associated with a unique one of said supersamples, wherein when the color value of each supersample is either said first color value or said second color value, then each field associated with a supersample having said first color value stores an identifier that identifies said first image memory, and each field associated with a supersample having said second color value stores an identifier that identifies said second image memory, and
an image processor, coupled to receive a pixel packet from the scan conversion subsystem, and further coupled to update said pixel memory, wherein said image processor generates antialiased display data based on said pixel memory, and wherein said image processor includes, means for determining a new pixel state based on said current pixel state and said pixel packet, and
means for updating said pixel memory based on said new pixel state; and
a display subsystem, coupled to receive said antialiased display data.

21. A method, comprising the steps of:
initializing a region mask that is used to indicate a state of a pixel comprising a plurality of supersamples, wherein said region mask comprises a plurality of fields equal in number to said plurality of supersamples, wherein each of said plurality of fields is associated with a unique one of said supersamples;
generating a first coverage mask associated with said pixel and with a first polygon image having a color, wherein said first coverage mask indicates the supersamples covered by said first polygon image;
storing a first color value in a first image memory, wherein said first color value is a function of at least said color of said first polygon image;
updating said region mask based on said first coverage mask, wherein after said region mask is updated said region mask contains data identifying said supersamples covered by said first polygon image;
generating a second coverage mask associated with said pixel and with a second polygon image having a color, wherein said second coverage mask identifies the supersamples covered by said second polygon image;
storing a second color value in a second image memory, wherein said second color value is a function of at least said color of said second polygon image; and
updating said region mask based on said second coverage mask, wherein after said region mask is updated said region mask associates a first group of said supersamples with said first color value and associates a second group of said supersamples with said second color value.

22. The method of claim 21, further comprising the step of associating each of said plurality of supersamples with a supersample memory comprising a color field that stores a color value.

23. The method of claim 22, further comprising the step of storing a color value in each color field only if more than two colors are associated with said pixel.

24. The method of claim 21, wherein each of said fields consists of a single binary digit that can hold one of two values: 0 or 1.

25. The method of claim 21, further comprising the step of initializing a mode identifier, wherein said mode identifier together with said region mask indicates said state of said pixel.

* * * * *